United States Patent Office 3,535,573
Patented Oct. 20, 1970

3,535,573
DIRECT CURRENT HETEROPOLAR ELECTRICAL MACHINES
Anthony D. Appleton, Bernard K. Ginty, and Robert B. MacNab, Newcastle upon Tyne, England, assignors to International Research & Development Company Limited, Fossway, Newcastle upon Tyne, England
Filed Oct. 18, 1968, Ser. No. 768,835
Claims priority, application Great Britain, Oct. 18, 1967, 47,509/67
Int. Cl. H02k *31/00*
U.S. Cl. 310—177                     12 Claims

ABSTRACT OF THE DISCLOSURE

A direct current heteropolar electrical machine in which instead of connecting individual conductors of the rotor to separate commutator segments the conductors are connected in series to form a small number of windings and the ends only of the windings are connected to individual segments of a segmented ring. These segments then being interconnected with other segments of the ring in such a way that a continuous direct current occurs at the brushes contacting the ring with reversal of the current in each winding for every pole pitch of revolution of the rotor.

---

The present invention relates to direct current heteropolar electrical machines.

A requirement exists for a compact, robust, high speed electric motor whose speed can be readily varied and which is capable of efficient operation at low voltage and high current. Such a motor would be suitable for driving the road wheels of electric vehicles. Conventional heteropolar motors fail to meet this requirement since the commutator system with a multiplicity of connections between the ends of the rotor coils and the commutator segments is not sufficiently robust for high speed operation. In homopolar motors the required operating voltage can only be obtained with the use of a large number of brushes and these again detract from the robustness and reliability of the motor.

In the heteropolar machine to be described in this specification, instead of connecting each individual coil of the rotor winding to a commutator segment as in the conventional form, the individual coils are connected in series to form at least two separate windings and only the ends of the windings are connected to individual insulated segments of a segmental ring which replaces the conventional commutator. Thus instead of a multiplicity of connections to the segments from the individual coils, as in a conventional machine, only those connections linking the ends of each winding are required in the basic form. With such a construction interconnections necessary to ensure continuous output can be inbuilt into the segmental ring assembly. In this way a robust machine can be constructed capable of operating at low or high voltage at high current and at high speed. Basically the number of brushes required is two but more can be connected in parallel if so desired.

In accordance with the present invention there is provided a direct current heteropolar electrical machine having a stator with a ring of uniformly spaced poles of alternate polarity, a rotor having conductors connected in series to form two or more separate windings, a number of individually insulated conducting segments forming a segmental ring mounted on the rotor, the ends only of the windings being connected to the segmental ring, at least one pair of current-transfer brushes in engagement with the segmental ring, and interconnections between the segments such as to ensure a continuous direct current at the brushes with reversal of the current in each rotor winding for every pole pitch of revolution of the rotor.

Each winding can consist of a number of conductors connected electrically in parallel under a given pole or each pair of adjacent conductors can be formed of a number of series connected conductor strands.

The invention will now be described in more detail with reference to the accompanying drawings in which.

Figure 1:
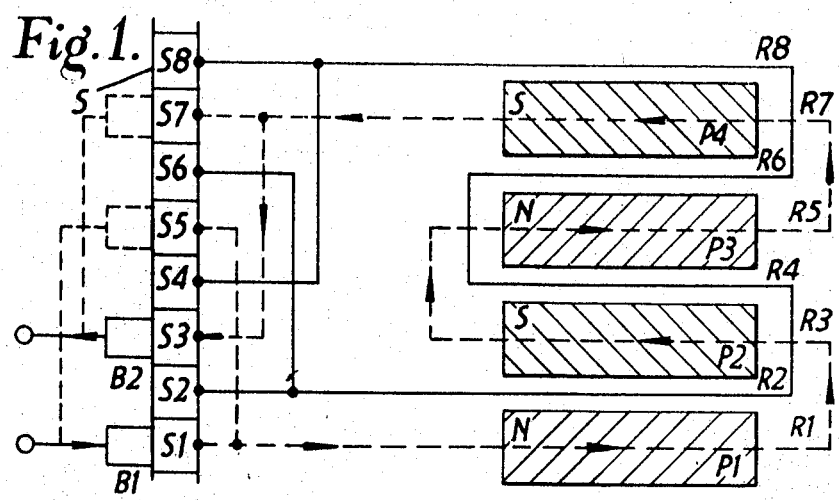
FIGS. 1–4 show developed views of the rotor conductors and segmental rings and the interconnections between the two for four different positions of the rotor.

Referring to FIG. 1 the stator core of a heteropolar electrical machine in accordance with one form of the invention comprises four magnet poles $P_1$–$P_4$ of alternate polarity, poles $P_1$ and $P_3$ being for example North poles and $P_2$ and $P_4$, South poles.

Rotor conductors $R_1$–$R_8$ are uniformly spaced apart at a distance, in the form shown, of half a pole pitch and are connected to a number of individually insulated conductor segments $S_1$–$S_8$ of a segmental ring S there being in the form shown, the same number of segments as there are conductors. Alternator rotor conductors in the circumferential direction of the rotor are connected in series to form one winding and intermediate conductors are series connected to form a second winding. Thus, alternate conductors $R_1$, $R_3$, $R_5$, and $R_7$ are connected in series to form one winding and intermediate conductors $R_2$, $R_4$, $R_6$, and $R_8$ are connected in series to form the second winding.

In contact with the segmental ring S are two current transfer brushes $B_1$ and $B_2$ spaced apart by one pole pitch. The segment and brush width are chosen so that as the rotor rotates a winding lying in the gaps between poles is disconnected from the brushes. With such an arrangement a brush does not contact an adjacent segment until such time as the conductor associated with that segment is under the appropriate pole piece.

Alternate segments $S_1$, $S_3$, $S_5$, and $S_7$ are associated with the winding formed by conductors $R_1$, $R_3$, $R_5$, and $R_7$ and to ensure continuity of the series path through the winding the segments $S_1$ and $S_5$ are connected as are the segments $S_3$ and $S_7$.

Assuming that the machine acts as a motor and that current is fed in through brush $B_1$, the direction of current flow through conductors $R_1$, $R_3$, $R_5$, and $R_7$ is as shown by the arrows. The conductors $R_2$, $R_4$, $R_6$, and $R_8$ lying between the poles are disconnected and carry no current in the position shown in FIG. 1.

Figure 2:
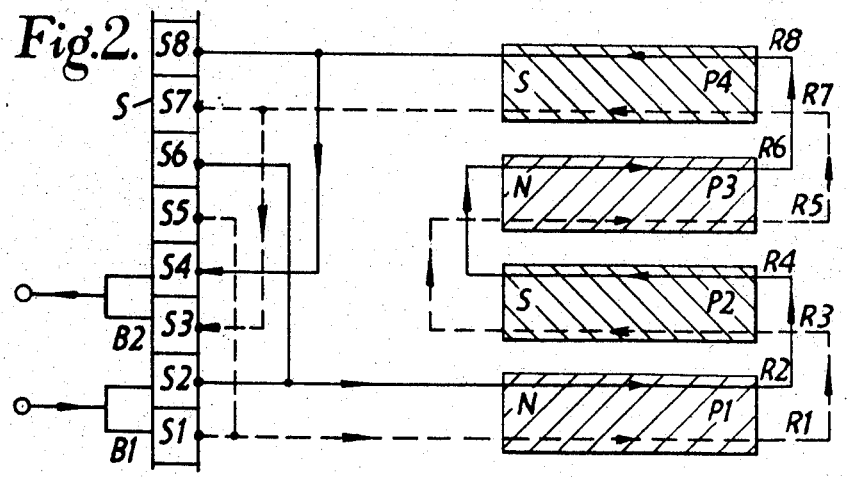

FIG. 2 shows the relative positions of brushes and rotor conductors after movement of the rotor by an amount sufficient to cause the brushes to span segments $S_1$, $S_2$ and $S_3$, $S_4$. In this position the conductors of both windings are under the influence of the poles and current flows in both windings in the direction shown by the arrows. It will be seen that the connections between segments and conductors are such that when the rotor is in this position the current flows in the same direction in each conductor under a given pole.

Figure 3:
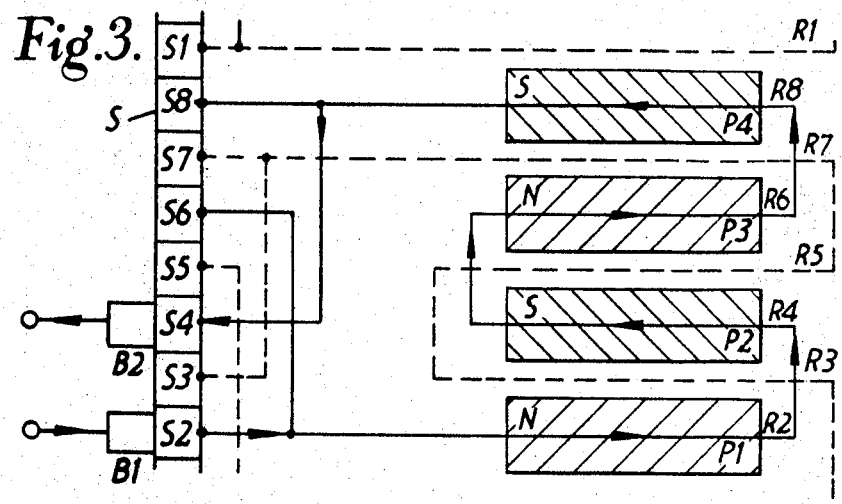

FIG. 3 shows the position of the rotor when the brushes come into contact solely with segments $S_2$ and $S_4$. In this position only the winding formed by conductors $R_2$, $R_4$, $R_6$, and $R_8$ carries current. The conductors $R_1$, $R_3$, $R_5$, and $R_7$ lie between the poles and the winding formed by the conductors is disconnected. As a consequence the current in the winding formed by these latter conductors falls to zero.

Figure 4:
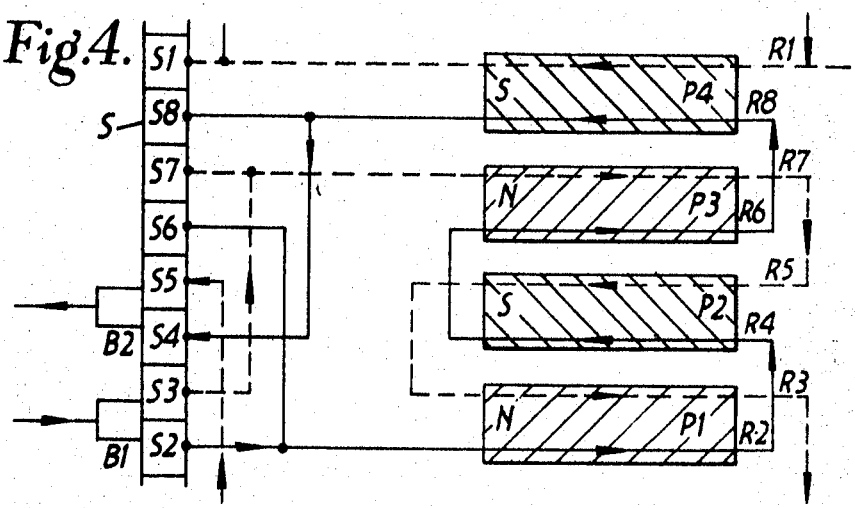

FIG. 4 shows a further position of the rotor where the brushes span segments $S_2$, $S_3$ and $S_4$, $S_5$. As in the position shown in FIG. 2 both windings carry current, but it will be seen that the direction of current in the winding formed by conductors $R_1$, $R_3$, $R_5$, and $R_7$ is now in the reverse direction compared with the direction shown in FIGS. 1 and 2.

Further rotation of the rotor reduces the current in the winding formed by conductors $R_2$, $R_4$, $R_6$, and $R_8$ to zero and then subsequently a current is induced in these conductors in the reverse direction. The effect is that for each winding the current varies from zero to a maximum value in one direction and back through zero to a maximum in the reverse direction, the reversal of current and hence in voltage across the winding taking place several times during one revolution of the rotor, namely, once every pole pitch.

The operating voltage at any instant is the sum of the voltages across the series connected conductors of each winding.

The number of brushes used in the above arrangement is two but more brushes can be used if desired, the pairs of brushes being connected in parallel, for example, as shown dotted in FIG. 1. The brushes of each pair would be an odd number of pole pitches apart, for example, 1, 3, 5, etc. The maximum number of brushes would be half the number of segments.

In the forms shown in FIGS. 1–4 four poles are shown but the number of poles used can be chosen to suit circumstances. They can be of conventional form, either permanent or electromagnets, if space or manufacturing considerations permit, and the poles are always uniformly spaced. Where space or manufacturing considerations do impose a limit on the number of poles used it is possible to use a construction in which the excitation is produced from a single magnetising winding.

Figure 5:
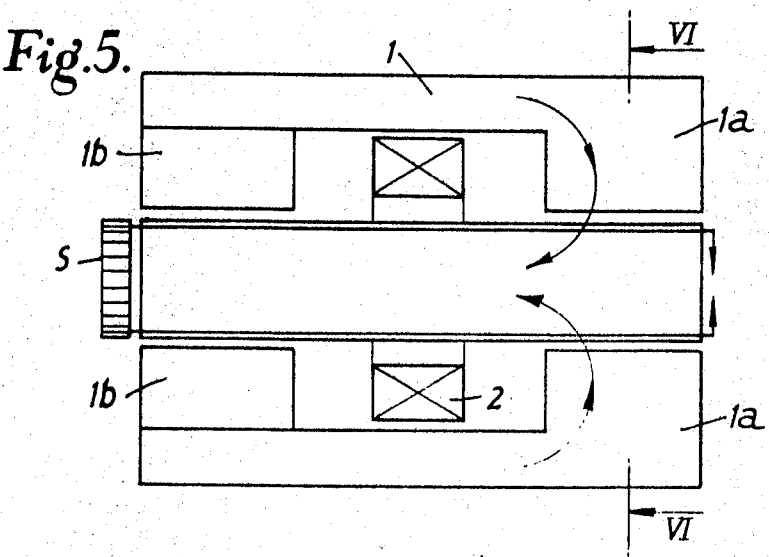
FIG. 5 shows a longitudinal section through a machine in accordance with one embodiment of the invention.
Figure 6:
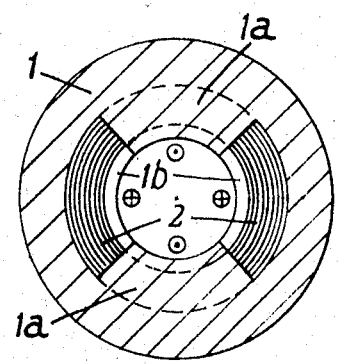
FIG. 6 is a section of line VI—VI of FIG. 5.

FIGS. 5 and 6 show sections through a machine with a single magnetising coil surrounding the rotor. The stator core 1 has pole pieces 1a, 1b disposed on either side of the coil 2, thus pole pieces 1a are disposed on one side of the coil and pole pieces 1b in the other side of the coil. As can be seen from FIG. 6 the pole pieces 1a, 1b are staggered with respect to one another around the stator periphery.

Figure 7:
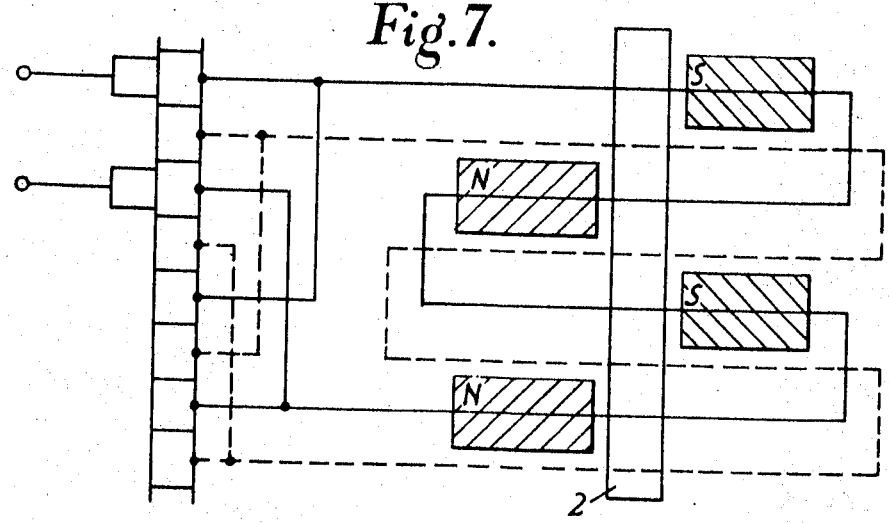
FIG. 7 is a developed view showing a pole arrangement and conductor-segment connections in accordance with another embodiment of the invention.

FIG. 7 shows a developed view of the machine of FIGS. 5 and 6 showing the conductor and segment connections. These connections are basically the same as those described in FIG. 1, there being two separate windings in which the current varies from a maximum in one direction through zero to a maximum in the reverse direction and then back to zero.

Figure 8:
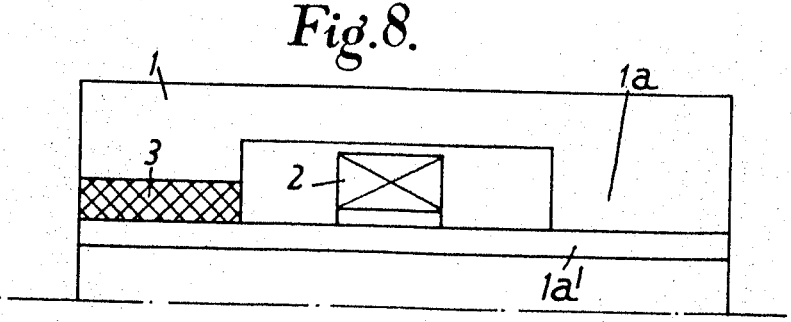
FIG. 8 is a section through part of a pole constructed in accordance with a still further embodiment of the invention.

With the pole arrangement shown in FIGS. 5–7 the portion of a conductor lying under a pole piece at any given time is substantially less than the length of the conductor and in some circumstances it may be advisable to increase the length of conductor subjected to the flux from the pole by providing a pole shoe which extends along the length of the conductor and passes between pole pieces on the other side of the magnetising coil. FIG. 8 shows a typical arrangement. The core construction is basically similar to that shown in FIG. 5 except that in FIG. 8 part of the core opposite a pole face and on the opposite side of the magnetising coil 2 is extended radially towards the rotor surface but is separated by magnetic insulation 3 from a pole shoe 1a' which extends from the pole face 1a along a substantial portion of the rotor conductor length. The magnetic insulation may be of non-magnetic stainless teel, brass or wood laminate or other suitable non-magnetic material and the thickness would be chosen to give an acceptable value of flux leakage.

Figure 9:
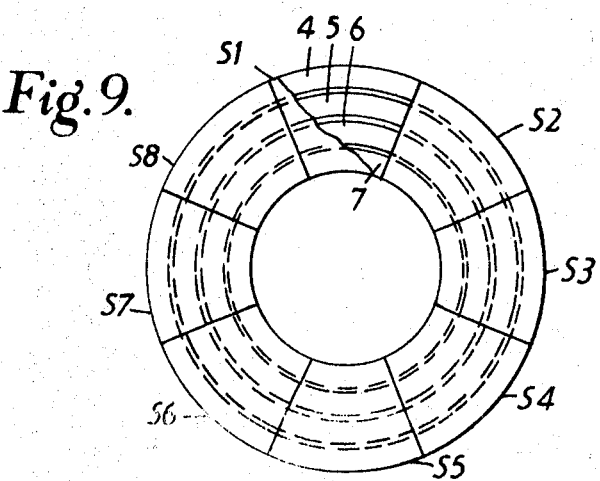
FIG. 9 shows a segmental ring construction in accordance with one embodiment of the invention.

Because of the construction in accordance with the invention the number of connections between the rotor conductors and the segments of the segmental ring is reduced compared with conventional heteropolar machines using a commutator and the interconnections necessary between segments to ensure continuity of output can conveniently be inbuilt into the segmental ring itself. FIG. 9 shows one such inbuilt construction. The segmental ring comprises four concentric conducting rings 4–7 individually insulated from one another and forming an annular disc. On end end face of the disc are mounted segments $S_1$–$S_8$ of the truncated sector shape shown.

Assuming a construction of the form shown in FIGS. 1–4, the segments $S_1$ and $S_5$ would be connected to ring 4 but insulated from the other rings 5–7, segments $S_2$ and $S_6$ would be connected to ring 5, but insulated from rings 4, 6, and 7, segments $S_3$ and $S_7$ would be connected to ring 6 but insulated from rings 4, 5, and 7 and segments $S_4$ and $S_8$ would be connected to ring 7 but insulated from rings 4, 5, and 6. Other arrangements are of course possible in that whilst for example, segments $S_2$ and $S_6$ must be connected to the same ring it need not be a ring adjacent the ring to which rings $S_1$ and $S_5$ are connected as in the example given above. Part of segment $S_1$ has been shown cut-away to show the rings 4–7.

The rotor of the machine may be of solid material or may be laminated to reduce eddy current losses.

The armature reaction of the machine may be reduced or effectively eliminated, if desired, by the provision of a stationary winding on the pole faces. This winding could be in the form of a sheet of conductor material or formed of conductor bars arranged to carry current in the opposite direction to the current in the conductors when they are under the poles. The conductors of the winding in the pole faces are connected in series and the winding is connected in series with the rotor winding for example, by connecting the winding in the poles between a supply and the brushes or between output terminals and the brushes in the case of a generator.

A possible variation of the construction is to provide another pair of windings with connections similar to those described in FIGS. 1–4, but connected to a segmental ring at the opposite end of the rotor. This would enable an increase of output for a given frame size.

Figure 10:
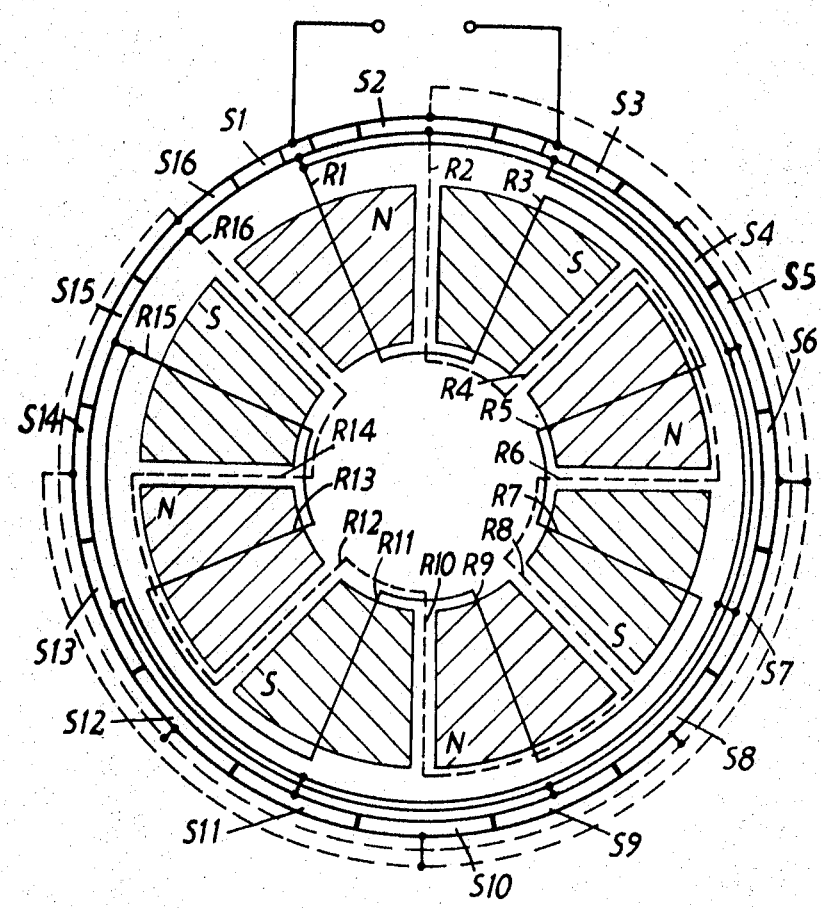
FIG. 10 is an end view of a machine in accordance with another embodiment of the invention having a disc type rotor.

Whilst the arrangements described above envisage the use of a drum-type rotor, a disc-type rotor can be used on the same prinicple. FIG. 10 shows a disc-type rotor in which the conductors $R_1$–$R_{16}$ are mounted radially on a non-magnetic disc. The conductors $R_1$, $R_3$, $R_5$, $R_7$, $R_9$, $R_{11}$, $R_{13}$, and $R_{15}$ can be on one side of the disc and the remaining conductors of the other winding on the other side of the disc. Alternatively they could all be on the same side of the disc. The segments can be arranged around the periphery of the disc as shown.

Figure 11:
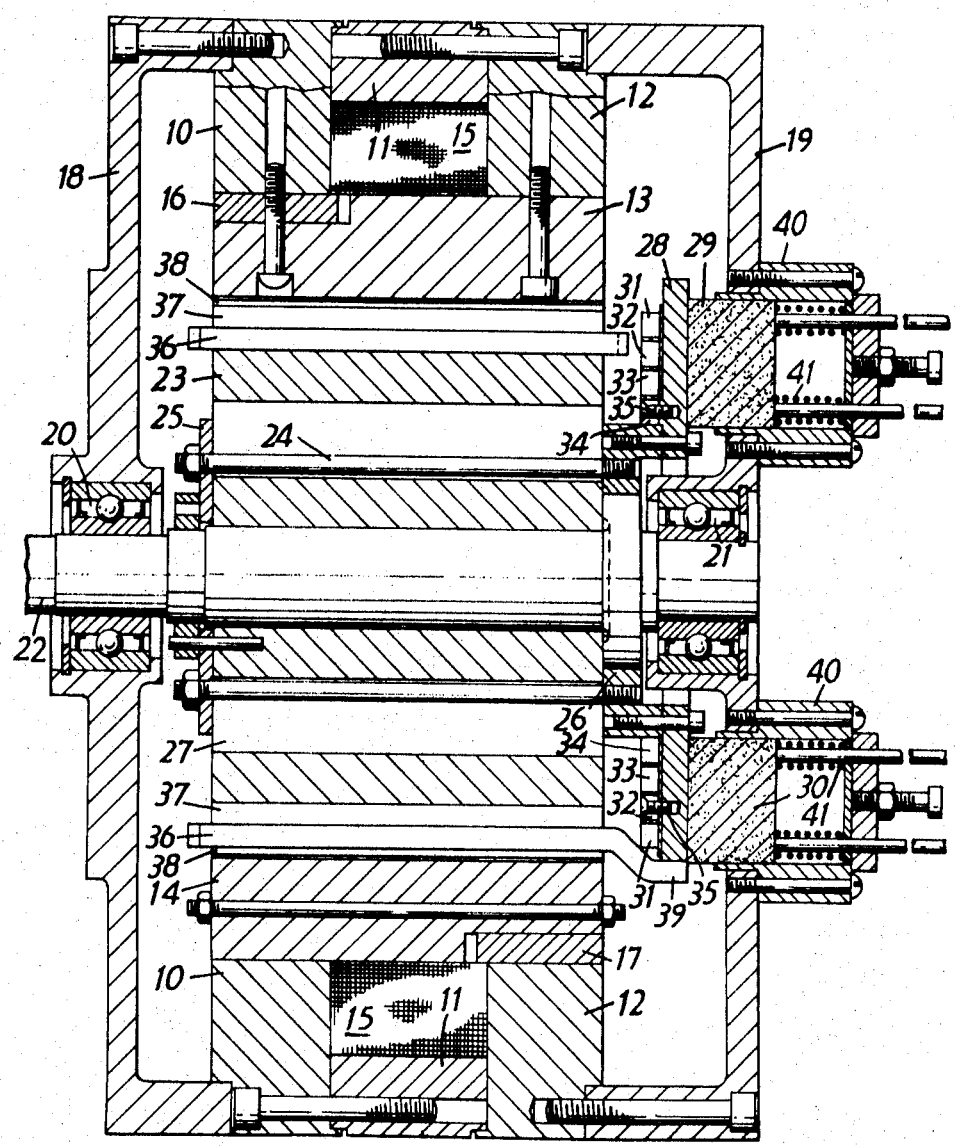
FIG. 11 is a cross-section of a D.C. heteropolar motor in accordance with a further embodiment of the invention, the lower half being a section on a plane at right angles to the plane of the lower half.

The machine shown in cross-section in FIG. 11 is similar in principle to that described with reference to FIGS. 5, 6, 8, and 9. It has a stator made up of three ring members 10, 11, and 12 and a number of pole members, of which pole members 13 and 14 can be seen. These parts are bolted together as shown and an annular field coil 15 is disposed between the end ring members 10 and 12 and surrounding the pole members 13 and 14. The pole members 13 and 14 are of opposite polarity and while the pole member 13 is bolted to the ring member 12 and is spaced from the ring member 10 by a non-magnetic spacer 16, the pole member 14 is bolted to the ring member 10 and is spaced from the ring member 12 by a non-magnetic spacer 17.

End cover plates 18 and 19 are bolted to the stator and carry bearings 20 and 21, respectively, in which a rotor shaft 22 is mounted. A laminated rotor 23 is carried on the shaft 22. The rotor laminations are held together by clamping bolts 24 extending between a clamping plate 25 and a bush 26. The bolts 24 pass through axially-etxending ventilation holes 27 in the rotor. The bush 26 supports a segmented ring 28 which is engaged by spaced brushes 29 and 30. The segments of the ring 28 are interconnected by insulated rings 31, 32, 33, and 34 which are supported and electrically-connected to individual segments by bolts 35 in a manner similar to that described with reference to FIG. 9.

The rotor 23 is formed with axially-extending slots in its periphery which accommodate rotor conductors 36. The slots are filled with packing 37 and closed by wedges 38. Alternate conductors 36 around the periphery of the rotor are connected together across the end faces of the rotor to form the windings. At the ends of the windings a conductor end such as 39 is brought out and bonded to one of the segments of the ring 28.

The brushes 29 and 30 are supported in housings 40 and are biassed against the segmented ring 28 by springs 41.

Many variations are possible within the scope of the invention and whilst in the forms illustrated the pitch of adjacent conductors is one half of a pole pitch other spacing arrangements are possible. It is not essential that, at any given instant, one winding lie in gaps formed between poles nor is it essential for conductors of only one winding to be associated with a given pole at any instant.

The number of segments used is equal to the product of the number of poles multiplied by the number of windings, the pole spacing and conductor spacing must be uniform and for each pair of brushes the spacing must be an odd number of pole pitches, for example, 1, 3, 5, etc. The interconnections between windings and segments must be such that the current in each winding reverses every pole pitch.

Each winding may comprise a number of conductors in parallel or instead of each winding having one conductor per pole as in the form shown in FIGS. 1–4, the arrangement can be that each winding is formed by two or more series connected coils each coil comprising several conductors in slots one pole pitch apart.

The robustness of motors in accordance with the invention is due in large measure to the fact that the number of connections between rotor conductors and segments is substantially reduced compared with the conventional commutator arrangement. Only the ends of the windings are connected to the segments and by building the interconnections between segments into the ring itself, for example, by using the concentric conductor arrangement of FIG. 9 the robustness is enhanced and consequently it is capable of operation at much higher speed than the conventional commutator motor.

Motors constructed in accordance with the invention are particularly suitable for battery powered vehicles because of their capability of operation at battery voltages and of giving high output at high speed. They are also compact and robust.

Generators working on the same principle can also be constructed.

We claim:

1. A direct current heteropolar electrical machine having
   a stator comprising a plurality of poles of alternate polarity uniformly spaced in a ring around the stator,
   a rotor,
   separate first and second windings on said rotor each composed of a plurality of conductors connected in series,
   a number of individually insulated conducting segments forming a segmental ring mounted on said rotor,
   the ends only of said first and second windings being connected to the segmental ring,
   at least one pair of current-transfer brushes engaging the segmental ring, and interconnections between said segments whereby a continuous direct current occurs at said brushes with reversal of the current in each rotor winding for every pole pitch of revolution of the rotor, the conductors of each rotor winding being uniformly spaced around the rotor so that at an instant when one conductor of the winding lies in a gap between adjacent poles all the other conductors of the winding lie in similar gaps between adjacent poles, the number of segments in the segmental ring being equal to the product of the number of poles multiplied by the number of rotor windings, the brush spacing in each pair being an odd number of the pole pitches, and the brush width and the width of each segment being such that each winding is disconnected from the brushes as it passes between poles.

2. A machine as claimed in claim 1 having at least two pairs of brushes connected electrically in parallel.

3. A machine as claimed in claim 1 having a single magnetising winding on the stator to excite the magnetic field of the poles.

4. A machine as claimed in claim 3 in which the magnetising coil is disposed to form a ring around the rotor axis and the conductors forming the rotor windings extend transversely with respect to the coil, the parts of the stator core forming the pole pieces being disposed so that pole pieces of one polarity lie on the opposite side of the coil in the direction of the rotor conductors to the pole pieces of opposite polarity and the pole pieces on one side being staggered with respect to the pole pieces on the other side.

5. A direct current heteropolar electrical machine as claimed in claim 4 in which a pole face is extended along the full length of the rotor conductors and passes between the coil and the rotor surface.

6. A machine as claimed in claim 1 in which the segmental ring is in the form of an annular disc divided into segments of truncated sector shape and attached to one face of the disc is a plurality of concentric ring conductors individually insulated from one another and from selected segments of the disc, the said rings forming the said interconnections between the segments of the segmental ring.

7. A machine as claimed in claim 1 having a stationary winding on each pole face comprising conductors arranged to carry current in the opposite direction to the current flowing in the rotor conductors whereby armature reaction is eliminated.

8. A machine as claimed in claim 1 in which each rotor winding comprises a number of conductors connected electrically in parallel.

9. A machine as claimed in claim 1 in which each rotor winding comprises two or more series connected coils each coil comprising several conductors in slots one pole pitch apart.

10. A machine as claimed in claim 1 in which the rotor is in the form of a disc and the conductors forming the rotor windings extend radially across the face of the disc.

11. A machine as claimed in claim 1 in which the rotor is in the form of a cylinder or drum with the conductors of the rotor windings disposed substantially parallel to the axis of the cylinder.

12. A direct current heteropolar electric machine having a stator core forming a plurality of poles of alternate polarity uniformly spaced in annular fashion around the stator, a rotor having conductors which, as the rotor rotates, cut the lines of force of the magnetic field produced by said stator core, the rotor conductors being connected in series so as to form at least two separate windings, the conductors of each winding being uniformly spaced around the rotor so that an instant when one conductor of the winding lies in a gap between adjacent poles all the other conductors of the winding lie in similar gaps between adjacent poles, said machine also incorporating at least one segmental ring mounted on said rotor and formed of a number of individually insulated conducting segments to which only the ends of each winding are connected, the number of segments being equal to the product of the number of poles multiplied by the number of windings, at least one pair of brushes adapted to engage said segmental ring in sliding contact as the rotor rotates, one brush feeding current into said ring and the other brush collecting current from said ring, the brush spacing in each pair being an odd number of pole pitches apart whilst the brush width and width of each segment is such that each winding is disconnected from the brushes as it passes between poles, and interconnections between segments of the segmental ring and the ends of each winding such that the current in each winding reverses once every pole pitch.

References Cited

UNITED STATES PATENTS

| | | | |
|---|---|---|---|
| 1,196,773 | 9/1916 | Girvin | 310—177 |
| 2,408,219 | 9/1946 | Liwschitz. | |
| 2,714,174 | 7/1955 | Applegate | 310—265 |
| 3,239,703 | 3/1966 | Long | 310—265 |

DONOVAN F. DUGGAN, Primary Examiner

R. SKUDY, Assistant Examiner

U.S. Cl. X.R.

310—207, 234, 249, 265